United States Patent
Nguyen et al.

(10) Patent No.: US 12,412,037 B2
(45) Date of Patent: Sep. 9, 2025

(54) MACHINE LEARNING METHOD AND NAMED ENTITY RECOGNITION APPARATUS

(71) Applicant: FUJITSU LIMITED, Kawasaki (JP)

(72) Inventors: An Le Nguyen, Yokohama (JP); Hajime Morita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 365 days.

(21) Appl. No.: 17/966,908

(22) Filed: Oct. 17, 2022

(65) Prior Publication Data

US 2023/0044266 A1 Feb. 9, 2023

Related U.S. Application Data

(63) Continuation of application No. PCT/JP2020/017488, filed on Apr. 23, 2020.

(51) Int. Cl.
*G06F 40/00* (2020.01)
*G06F 16/903* (2019.01)
(Continued)

(52) U.S. Cl.
CPC ...... *G06F 40/295* (2020.01); *G06F 16/90335* (2019.01); *G06F 40/242* (2020.01); *G06F 40/284* (2020.01); *G06N 20/00* (2019.01)

(58) Field of Classification Search
CPC .... G06F 40/295; G06F 40/284; G06F 40/242; G06F 40/30; G06F 40/237; G06F 18/23;
(Continued)

(56) References Cited

U.S. PATENT DOCUMENTS 9,190,055 B1 * 11/2015 Kiss ................ G10L 15/063
9,292,797 B2 * 3/2016 He ...................... G06N 5/02
(Continued)

FOREIGN PATENT DOCUMENTS

EP 3136257 A2 3/2017
JP 2006-023968 A 1/2006
(Continued)

OTHER PUBLICATIONS

Kai Xu et al., "Document-level Attention-based BiLSTM-CRF Incorporating Disease Dictionary for Disease Named Entity Recognition", Elsevier, Computers in Biology and Medicine, vol. 108, pp. 122-132, May 2019 (Total 11 pages).
(Continued)

*Primary Examiner* — Abdelali Serrou
(74) *Attorney, Agent, or Firm* — Fujitsu Intellectual Property Center

(57) ABSTRACT

A computer divides a character string included in text data into a plurality of tokens. The computer searches, by performing matching processing between a token string indicating a specific number of consecutive tokens among the plurality of tokens and dictionary information including a plurality of named entities, the plurality of named entities for a similar named entity whose similarity to the token string is equal to or more than a threshold. The computer converts matching information indicating a result of the matching processing between the token string and the similar named entity into first vector data. The computer generates input data by using a plurality of pieces of vector data converted from the plurality of tokens and the first vector data. The computer generates a named entity recognition model that detects a named entity by performing machine learning using the input data.

8 Claims, 12 Drawing Sheets

(51) Int. Cl.
  *G06F 40/242* (2020.01)
  *G06F 40/284* (2020.01)
  *G06F 40/295* (2020.01)
  *G06N 20/00* (2019.01)

(58) Field of Classification Search
  CPC ...... G06F 40/20; G06F 40/247; G06F 40/253; G06F 16/2228; G06F 16/3344; G06F 16/338; G06F 16/35; G06F 16/374; G06F 16/9017; G06F 16/9024; G06F 16/95; G06F 16/951; G06F 16/90335; G06F 17/18; G06F 18/214; G06F 18/22; G06F 18/2431; G06F 18/24317; G06F 18/295; G06F 40/129; G06F 40/169; G06F 40/45; G06F 40/58; G10L 15/06
  See application file for complete search history.

(56) References Cited

U.S. PATENT DOCUMENTS

| | | | |
|---|---|---|---|
| 9,311,290 B2* | 4/2016 | Chen | G06F 40/242 |
| 9,575,963 B2* | 2/2017 | Pasupalak | G06F 40/35 |
| 9,836,453 B2* | 12/2017 | Radford | G06F 16/93 |
| 9,971,763 B2* | 5/2018 | Abdel-Reheem | G06F 40/45 |
| 10,810,375 B2* | 10/2020 | Mass | G06F 40/295 |
| 10,997,223 B1* | 5/2021 | Christodoulopoulos | G06F 40/295 |
| 11,030,407 B2* | 6/2021 | Hagiwara | G06F 40/58 |
| 11,043,291 B2* | 6/2021 | Bhagwan | G06F 16/374 |
| 11,681,944 B2* | 6/2023 | Bhat | G06F 40/295 706/12 |
| 2009/0326923 A1* | 12/2009 | Yan | G06F 40/30 704/10 |
| 2017/0060835 A1 | 3/2017 | Radford et al. | |
| 2017/0084269 A1 | 3/2017 | Shi et al. | |
| 2019/0034407 A1 | 1/2019 | Hagiwara et al. | |
| 2020/0012719 A1* | 1/2020 | Mass | G06F 40/295 |
| 2021/0334309 A1 | 10/2021 | Tsutsumi et al. | |

FOREIGN PATENT DOCUMENTS

| | | |
|---|---|---|
| JP | 6077727 B1 | 2/2017 |
| JP | 2017-045453 A | 3/2017 |
| JP | 2017-059205 A | 3/2017 |
| WO | 2019/224891 A1 | 11/2019 |

OTHER PUBLICATIONS

Alexandre Passos et al., "Lexicon Infused Phrase Embeddings for Named Entity Resolution", Proceedings of the 18th Conference on Computational Language Learning, pp. 78-86, Jun. 26-27, 2014, 2014 Association for Computational Linguistics (Total 9 pages).

Zhihao Yang et al., "Exploiting the Performance of Dictionary-based Bio-Entity Name Recognition in Biomedical Literature", Elsevier, Computational Biology and Chemistry, vol. 32 Issue 4, pp. 287-291, DOI:10.1016/j.compbiolchem.2008.03.008, Aug. 2008 (Total 5 pages).

Yoshimasa Tsuruoka et al., "Improving the Performance of Dictionary-based Approaches in Protein Name Recognition", Elsevier, Journal of Biomedical Informatics, vol. 37 Issue 6, pp. 461-470, DOI:10.1016/j.ibi.2004.08.003, Dec. 2004 (Total 10 pages).

Masatoshi Tsuchiya et al., "Robust Extraction of Japanese Named Entity Including Infrequent Word", IPSJ (Information Processing Society of Japan) SIG Technical Reports, vol. 2008, No. 46, pp. 1-6 (2008-NL-185/2008-SLP-71), ISSN 0919-6072, May 15, 2008 (Total 7 pages) (Cited in ISR).

Jingjing Xu et al., "A Discourse-Level Named Entity Recognition and Relation Extraction Dataset for Chinese Literature Text", arXiv:1711.07010v1 [cs.CL], Nov. 19, 2017 (Total 6 pages).

International Search Report (Form PCT/ISA/210), mailed in connection with PCT/JP2020/017488 and mailed Jun. 23, 2020 (Total 2 pages).

* cited by examiner

NAMED ENTITY DICTIONARY 131

| TERM ID | NAMED ENTITY | CLASS |
| --- | --- | --- |
| #101 | epidermal growth factor | Gene/Protein |
| #102 | epidermal growth factor-like 2 | Gene/Protein |
| #103 | epidermal growth factor receptor | Gene/Protein |
| #104 | pro-epidermal growth factor | Gene/Protein |
| ... | ... | ... |

FIG. 5

MATCHING PATTERN DICTIONARY                     132

| PATTERN ID | MATCHING PATTERN | DISTRIBUTED REPRESENTATION |
|---|---|---|
| 1 | Gene/Protein-Exact-B | (3, 2, −3, 2, 6) |
| 2 | Gene/Protein-Exact-I | (···) |
| 3 | Gene/Protein-Exact-E | (···) |
| 4 | Gene/Protein-Exact-S | (···) |
| 5 | Gene/Protein-Approximate-B | (1, 6, −1, 0, 7) |
| 6 | Gene/Protein-Approximate-I | (0, 4, 6, 3, 7) |
| ... | ... | ... |

FIG. 6

MACHINE LEARNING METHOD AND NAMED ENTITY RECOGNITION APPARATUS

CROSS-REFERENCE TO RELATED APPLICATION

This application is a continuation application of International Application PCT/JP2020/017488 filed on Apr. 23, 2020 which designated the U.S., the entire contents of which are incorporated herein by reference.

FIELD

The embodiments discussed herein relate to a machine learning technique.

BACKGROUND

Named entity recognition (NER) is one technique for natural language processing. This named entity recognition may also be referred to as named entity extraction. Named entities include proper nouns such as personal names, organization names, and place names. In the named entity recognition, named entities are detected from text, and classes of the detected named entities are determined. There are cases in which the result of the named entity recognition is used as input for other tasks, such as relationship extraction for determining a relationship between words and entity linking for linking named entities in text with information in a knowledge database.

In the named entity recognition, there are cases in which an unknown word not listed in an existing dictionary needs to be recognized as a named entity. This situation may occur when a named entity, which is a technical term, is detected from text in a specific technical field. For example, the named entity recognition is performed in an attempt to detect named entities, such as gene names, drug names, and disease names, from text in the biomedical field. In the biomedical field, gene names and drug names are often compound words, and new gene names and drug names that are not listed in existing technical term dictionaries often appear in text.

As a method relating to the named entity recognition for unknown words, there has been proposed a dictionary expansion technique using approximate string matching. For example, there has been proposed a technique in which character string editing, such as insertion, deletion, or replacement of characters, is performed on a gene name registered in a dictionary to generate a candidate for another gene name. In addition, there has been proposed a technique in which a predetermined preceding keyword or subsequent keyword is added to a gene name registered in a dictionary to generate a candidate for another gene name.

In addition, as a method relating to the named entity recognition for unknown words, there has been proposed a machine learning model technique using exact string matching. For example, there has been proposed a technique in which words included in text are converted into word vectors in distributed representation, and confidence factors of named entity classes are calculated from the word vectors by using a multi-layer neural network including a bidirectional long short term memory (LSTM). In this proposed technique, for the words registered in a dictionary, auxiliary information indicating exact match with the dictionary is entered into the multi-layer neural network together with the word vectors. Because a confidence factor of a named entity class is also calculated for an unknown word, an unknown named entity could be detected by this technique.

See, for example, the following documents:
Yoshimasa Tsuruoka and Jun'ichi Tsujii, "Improving the performance of dictionary-based approaches in protein name recognition", Journal of Biomedical Informatics, Volume 37 Issue 6, pp. 461-470, December 2004
Zhihao Yang, Hongfei Lin and Yanpeng Li, "Exploiting the performance of dictionary-based bio-entity name recognition in biomedical literature", Computational Biology and Chemistry, Volume 32 Issue 4, pp. 287-291, August 2008
Alexandre Passos, Vineet Kumar and Andrew McCallum, "Lexicon Infused Phrase Embeddings for Named Entity Resolution", Proc. of the 18th Conference on Computational Natural Language Learning, pp. 78-86, June 2014
Jingjing Xu, Ji Wen, Xu Sun and Qi Su, "A Discourse-Level Named Entity Recognition and Relation Extraction Dataset for Chinese Literature Text", arXiv:1711.07010, 19 Nov. 2017

SUMMARY

In an aspect, there is provided a non-transitory computer-readable recording medium storing therein a computer program that causes a computer to execute a process including: dividing a character string included in text data into a plurality of tokens; searching, by performing matching processing between a token string indicating a specific number of consecutive tokens among the plurality of tokens and dictionary information including a plurality of named entities, the plurality of named entities for a similar named entity whose similarity to the token string is equal to or more than a threshold; converting matching information indicating a result of the matching processing between the token string and the similar named entity into first vector data; generating input data by using a plurality of pieces of vector data converted from the plurality of tokens and the first vector data; and generating a named entity recognition model that detects a named entity by performing machine learning using the input data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of a named entity dictionary;
FIG. 6 illustrates an example of a matching pattern dictionary.

DESCRIPTION OF EMBODIMENTS

The conventional dictionary expansion technique using approximate string matching increases recognizable named entities in accordance with a predetermined expansion rule. However, because the dictionary expansion in accordance with a predetermined expansion rule does not comprehensively cover unknown named entities, there is a limit to the improvement in recognition accuracy. In addition, the conventional machine learning model technique using exact string matching enables recognition of unknown named entities to some extent while ensuring the accuracy in recognizing the known named entities registered in a dictionary. However, in this technique, only the auxiliary information about the known named entities that exactly match the dictionary is provided. Thus, there is a limit to the improvement in the accuracy of recognizing unknown named entities.

Figure 1:
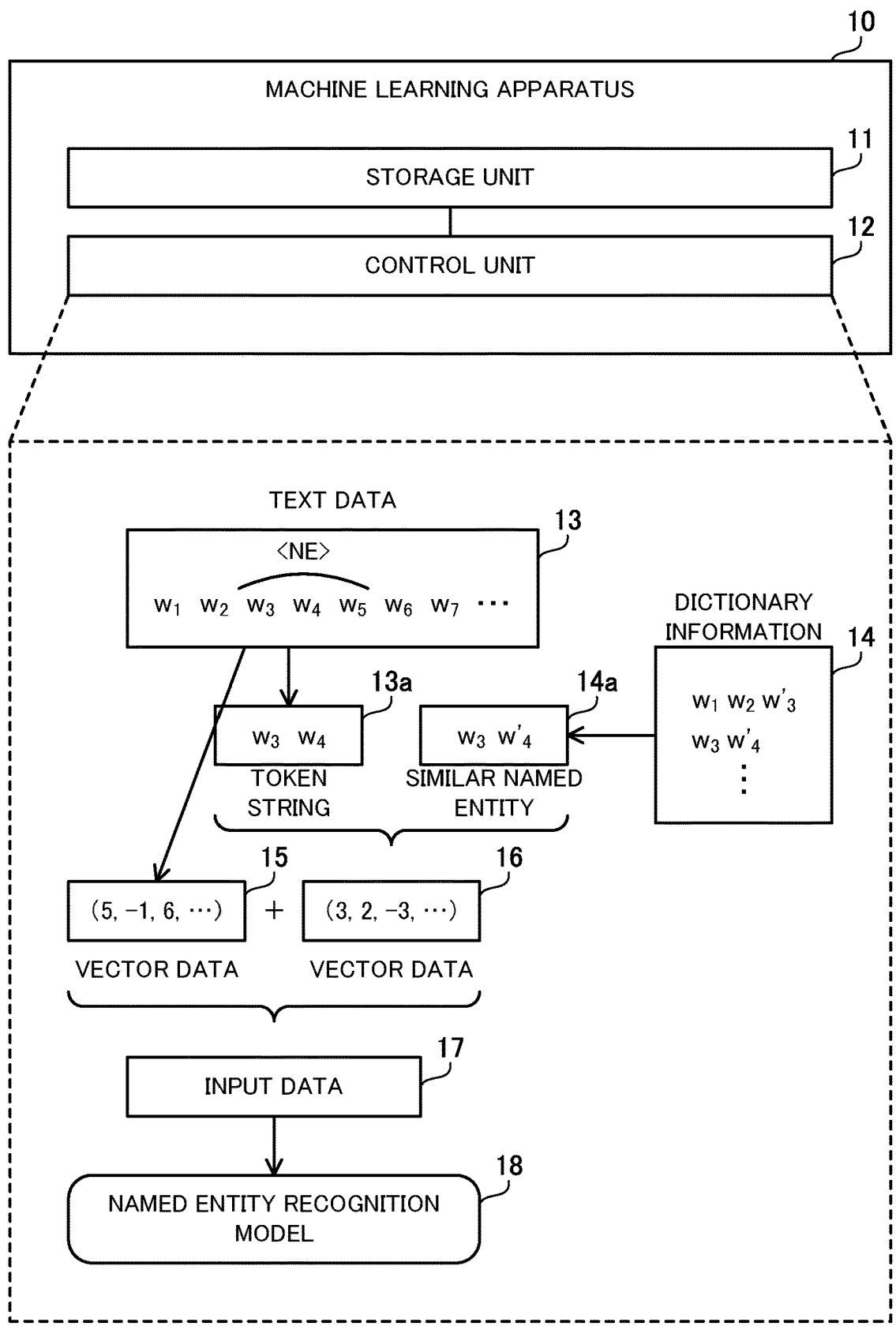
FIG. 1 illustrates a machine learning apparatus according to a first embodiment.

Hereinafter, the present embodiments will be described with reference to drawings. A first embodiment will be described. FIG. 1 illustrates a machine learning apparatus according to the first embodiment. The machine learning apparatus 10 generates a named entity recognition model for detecting named entities from input text data by performing machine learning. The machine learning apparatus 10 may be a client apparatus or a server apparatus. The machine learning apparatus 10 may be referred to as a computer or an information processing apparatus. Named entity recognition using a generated named entity recognition model may be performed by the machine learning apparatus 10 or another information processing apparatus.

The machine learning apparatus 10 includes a storage unit 11 and a control unit 12. The storage unit 11 may be a volatile semiconductor memory such as a random access memory (RAM) or a non-volatile storage such as a hard disk drive (HDD) or a flash memory. The control unit 12 is, for example, a processor such as a central processing unit (CPU), a graphics processing unit (GPU), or a digital signal processor (DSP). The control unit 12 may include an application-specific electronic circuit such as application-specific integrated circuit (ASIC) or a field programmable gate array (FPGA). The processor executes a program stored in a memory such as a RAM (which may be the storage unit 11). A group of processors may be referred to as a "multiprocessor" or simply a "processor".

The storage unit 11 stores text data 13 and dictionary information 14.

The text data 13 includes a character string representing a sentence written in natural language. The text data 13 is, for example, a document in a specific technical field, such as an academic paper in the biomedical field. The text data 13 is used as training data for machine learning. Thus, correct labels relating to named entities are assigned to the text data 13. For example, if a named entity is included in the text data 13, a tag indicating the named entity or a tag indicating a named entity class is assigned to the named entity. These correct labels are manually assigned in advance, for example.

The dictionary information 14 is a named entity dictionary in which a plurality of known named entities are listed. For example, the dictionary information 14 includes technical named entities such as gene names, drug names, and disease names. The dictionary information 14 may include classes to which the individual named entities belong. However, there may be a case in which the dictionary information 14 does not cover all named entities. The text data 13 may include named entities listed in the dictionary information 14 and may include named entities not listed in the dictionary information 14. Those named entities not listed in the dictionary information 14 may be referred to as unknown named entities or unknown words.

The control unit 12 generates a named entity recognition model 18 by performing machine learning as follows.

First, the control unit 12 divides a character string included in the text data 13 into a plurality of tokens. The character string is divided into these tokens by using, for example, a natural language processing technique such as morphological analysis. The individual token is a character string having a linguistic meaning and may be a word or a linguistic unit smaller than a word. A named entity may be a compound word. Thus, one token may form one named entity, and one token string including two or more tokens may form one named entity.

For example, a token string $(w_3, w_4, w_5)$ in the text data 13 forms one named entity. In the dictionary information 14, a token string $(w_1, w_2, w'_3)$ is listed as one named entity, and a token string $(w_3, w'_4)$ is listed as another named entity.

The control unit 12 extracts a token string 13*a* indicating a specific number of consecutive tokens from the text data 13. The specific number is, for example, two or more. The token string 13*a* including n tokens may be referred to as an n-gram. The control unit 12 may extract two or more token strings, each of which is formed by the same number n of tokens, from the text data 13. The control unit 12 may extract two or more token strings, each of which is formed by a different number n of tokens from the text data 13. The control unit 12 performs matching processing between the token string 13*a* and the dictionary information 14. In the matching processing, the control unit 12 compares each of the plurality of named entities included in the dictionary information 14 with the token string 13*a*.

In the matching processing, so-called approximate string matching is performed. The control unit 12 searches the plurality of named entities included in the dictionary information 14 for a named entity whose similarity to the token string 13*a* is equal to or more than a threshold. The control unit 12 determines the retrieved named entity as a similar named entity 14*a*. For example, the similarity between the token string 13*a* and a named entity may be the inverse number of an edit distance (Levenshtein distance) calculated between the token string 13*a* and the named entity. In this case, the control unit 12 may calculate an edit distance between the token string 13*a* and the individual named entity and determine a named entity having an edit distance equal to or less than a threshold as the similar named entity 14*a*. The edit distance is the number of times of addition, replacement, or deletion of one character performed to match a certain named entity with the token string 13*a*. The edit distance may be calculated by dynamic programming.

The token string 13*a* and the similar named entity 14*a* may exactly match with each other or may be similar to each other. Two or more similar entities may be retrieved for the token string 13*a*. For example, when the token string 13*a* is $(w_3, w_4)$, the control unit 12 determines that a token string $(w_1, w_2, w'_3)$ included in the dictionary information 14 is not similar to the token string 13a and determines that a token string ($w_3$, $w'_4$) included in the dictionary information 14 is similar to the token string 13a. In this case, the control unit 12 determines ($w_3$, $w'_4$) as the similar named entity 14a.

The control unit 12 converts matching information indicating a result of the matching processing performed between the token string 13a and the similar named entity 14a into vector data 16. The matching information is generated for each token included in the token string 13a, for example. The matching information generated for an individual token includes, for example, location information indicating a relative location of this individual token in the token string 13a. In addition, the matching information includes, for example, matching degree information indicating whether the token string 13a and the similar named entity 14a exactly match with each other. The matching information also includes, for example, class information indicating the named entity class to which the similar named entity 14a belongs.

The vector data 16 is a numerical string in which numerical values of a plurality of dimensions are listed. The vector data 16 may be distributed representation of matching information. For example, the matching information may be converted into the vector data 16 by using a trained neural network. The vector data 16 may be vector data of a large number of dimensions, e.g., vector data of 100 dimensions. The vector data 16 may have a distribution in which the numerical values of many dimensions are small and the numerical values of a small number of dimensions are large. In addition, similar matching information may be converted into similar vector data.

In addition to the vector data 16, the control unit 12 acquires a plurality of vector data converted from the plurality of tokens included in the text data 13. In FIG. 1, the control unit 12 acquires vector data 15 corresponding to a single token. The vector data 15 is a numerical string in which numerical values of a plurality of dimensions are listed. The vector data 15 may be distributed representation of a word. For example, the token may be converted into the vector data 15 by using a trained neural network. The trained neural network may be word2vec, for example. The vector data 15 may be vector data of a large number of dimensions, e.g., vector data of 300 dimensions. In addition, words having similar meanings may be converted into similar vector data.

The control unit 12 generates input data 17 by using the vector data 15 and the vector data 16. For example, the control unit 12 generates the vector data 15 and the vector data 16 for the token $w_3$ in the text data 13. Next, the control unit 12 concatenates the vector data 15 and the vector data 16 and defines the concatenated vector data as the vector data representing the token $w_3$. To concatenate the vector data 15 and 16, for example, the vector data 16 is placed after the vector data 15. In this case, the number of dimensions of the concatenated vector data is a sum of the number of dimensions of the vector data 15 and the number of dimensions of the vector data 16. Concatenated vector data may be generated for each token included in the text data 13.

Next, the control unit 12 generates a named entity recognition model 18 by performing machine learning using the input data 17. In the machine learning, for example, the input data 17 is treated as an explanatory variable, and the individual correct label assigned to the text data 13 is treated as an objective variable. The named entity recognition model 18 receives, for example, a plurality of vector data corresponding to a plurality of tokens as input and outputs the classes to which the plurality of tokens belongs.

The named entity recognition model 18 may output confidence factors representing probabilities, each of which indicates that a token belongs to an individual one of the plurality of classes. The named entity recognition model 18 may be a multi-layer neural network. For example, the control unit 12 enters the input data 17 into the named entity recognition model 18 and calculates an error by comparing the output of the named entity recognition model 18 with the corresponding correct label. The control unit 12 updates parameter values included in the named entity recognition model 18 such that the error is minimized. For example, a backpropagation method is used for updating the parameter values.

The control unit 12 outputs the trained named entity recognition model 18. For example, the control unit 12 stores the named entity recognition model 18 in a non-volatile storage. For example, the control unit 12 transfers the named entity recognition model 18 to another information processing apparatus. For example, the control unit 12 displays information about the named entity recognition model 18 on a display device.

The machine learning apparatus 10 according to the first embodiment performs matching processing between the token string 13a included in the text data 13 and the dictionary information 14 and searches for the similar named entity 14a whose similarity is within a predetermined range. Matching information indicating a result of the matching processing between the token string 13a and the similar named entity 14a is converted into the vector data 16. The input data 17 is generated by using the vector data 15 converted from a token and the vector data 16, and the named entity recognition model 18 is generated by performing machine learning using the input data 17.

As a result, the accuracy in recognizing an unknown named entity not listed in the dictionary information 14 is improved. Because the named entity recognition model 18 is a machine learning model that estimates whether an entity is a named entity by using the vector data converted from tokens as input, the named entity recognition model 18 is able to detect an unknown named entity not listed in the dictionary information 14. In addition, because the named entity recognition model 18 uses the matching information between the token string 13a and the dictionary information 14 as input, the named entity recognition model 18 is able to perform the estimation in view of the known named entities listed in the dictionary information 14.

In addition, in the matching processing, not only exact string matching but also approximate string matching is performed. Thus, the accuracy in recognizing a new named entity created by modifying a known named entity is also improved. For example, many gene names and drug names in the biomedical field are compound words, and there are many similar named entities having different endings. Even when such new technical named entities are used, by using the result of approximate string matching as input, the named entity recognition model 18 achieves improved recognition accuracy.

Figure 2:
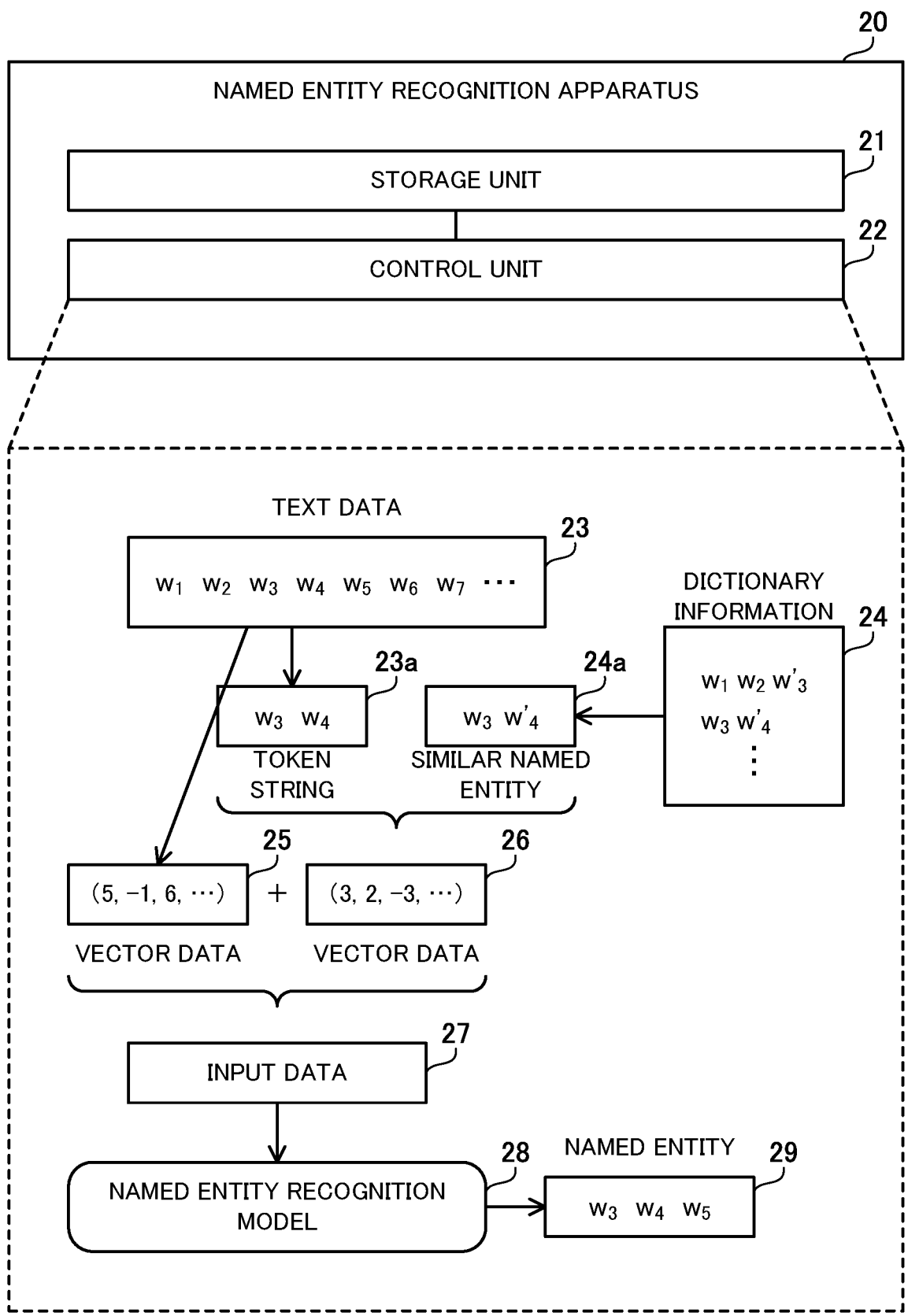
FIG. 2 illustrates a named entity recognition apparatus according to a second embodiment.

Next, a second embodiment will be described. FIG. 2 illustrates a named entity recognition apparatus according to a second embodiment. This named entity recognition apparatus 20 detects a named entity from text data by using the named entity recognition model generated by the machine learning apparatus 10 according to the first embodiment. The named entity recognition apparatus 20 may be a client apparatus or a server apparatus. The named entity recognition apparatus 20 may be referred to as a computer or an information processing apparatus. The named entity recognition apparatus 20 may be the same as the machine learning apparatus 10 according to the first embodiment.

The named entity recognition apparatus 20 includes a storage unit 21 and a control unit 22. The storage unit 21 may be a volatile semiconductor memory such as a RAM or a non-volatile storage such as an HDD or a flash memory. The control unit 22 is, for example, a processor such as a CPU, a GPU, or a DSP. The control unit 22 may include an application-specific electronic circuit such as an ASIC or an FPGA. The processor executes a program stored in a memory such as a RAM.

The storage unit 21 stores text data 23, dictionary information 24, and a named entity recognition model 28. The text data 23 includes a character string representing a sentence written in natural language. The text data 23 may be a document different from the text data 13 according to the first embodiment. Unlike the text data 13, correct labels do not need to be assigned to the text data 23. The dictionary information 24 is a named entity dictionary in which a plurality of known named entities are listed. The dictionary information 24 corresponds to the dictionary information 14 according to the first embodiment. However, the dictionary information 24 may be different from the dictionary information 14, as long as the dictionary information 24 is of the same kind as the dictionary information 14. For example, the dictionary information 24 belongs to the same technical field as that of the dictionary information 14. The named entity recognition model 28 is a machine learning model that receives input data based on the text data 23 and outputs a named entity estimation result. The named entity recognition model 28 corresponds to the named entity recognition model 18 according to the first embodiment.

The control unit 22 detects named entities from the text data 23 by using the named entity recognition model 28. To detect these named entities, the control unit 22 generates input data 27 to be entered into the named entity recognition model 28. The conversion from the text data 23 to the input data 27 is similar to the conversion from the text data 13 to the input data 17 according to the first embodiment.

That is, the control unit 22 divides a character string included in the text data 23 into a plurality of tokens and extracts a token string 23a indicating a specific number of consecutive tokens. The control unit 22 performs matching processing between the token string 23a and the dictionary information 24 and searches the dictionary information 24 for a similar named entity 24a whose similarity to the token string 23a is within a predetermined range.

The control unit 22 converts matching information indicating a result of matching processing between the token string 23a and the similar named entity 24a into vector data 26 (second vector data). The control unit 22 generates the input data 27 by using vector data 25 (first vector data) converted from a token included in the text data 23 and the vector data 26. For example, the control unit 22 concatenates the vector data 25 and the vector data 26 that correspond to the same token and defines the concatenated vector data as the vector data representing this token. The input data 27 includes, for example, vector data corresponding to each of the plurality of tokens.

The control unit 22 enters the input data 27 into the named entity recognition model 28 and detects a named entity 29 from the text data based on the output of the named entity recognition model 28. For example, the named entity recognition model 28 outputs tag information indicating that a token string ($w_3, w_4, w_5$) in the token string ($w_1, w_2, w_3, w_4, w_5, w_6, w_7, \ldots$) included in the text data 23 is the named entity 29. The named entity 29 detected by the named entity recognition model 28 may be an unknown word that is not listed in the dictionary information 24.

The named entity recognition apparatus 20 according to the second embodiment has improved accuracy in recognizing an unknown named entity not listed in the dictionary information 24. Because the named entity recognition model 28 is a machine learning model that estimates whether an entity is a named entity by using the vector data converted from tokens as input, the named entity recognition model 28 is able to detect an unknown named entity not listed in the dictionary information 24. In addition, because the named entity recognition model 28 uses the matching information between the token string 23a and the dictionary information 24 as input, the named entity recognition model 28 is able to perform the estimation in view of the known named entities listed in the dictionary information 24.

In addition, in the matching processing, not only exact string matching but also approximate string matching is performed. Thus, the accuracy in recognizing a new named entity created by modifying a known named entity is also improved. For example, many gene names and drug names in the biomedical field are compound words, and there are many similar named entities having different endings. Even when such new technical named entities are used, by using the result of approximate string matching as input, the named entity recognition model 28 achieves improved recognition accuracy.

Next, a third embodiment will be described. A machine learning apparatus 100 according to the third embodiment generates a named entity recognition model by performing machine learning and performs named entity recognition using the generated named entity recognition model. In the named entity recognition, a named entity that is not a common noun is detected from input text, and the category of the detected named entity is determined. According to the third embodiment, an academic paper in the biomedical field is processed as text, and technical named entities in the biomedical field such as gene names, drug names, or disease names are recognized. The machine learning apparatus 100 may be a client apparatus or a server apparatus. The machine learning apparatus 100 may be referred to as a computer or an information processing apparatus.

Figure 3:
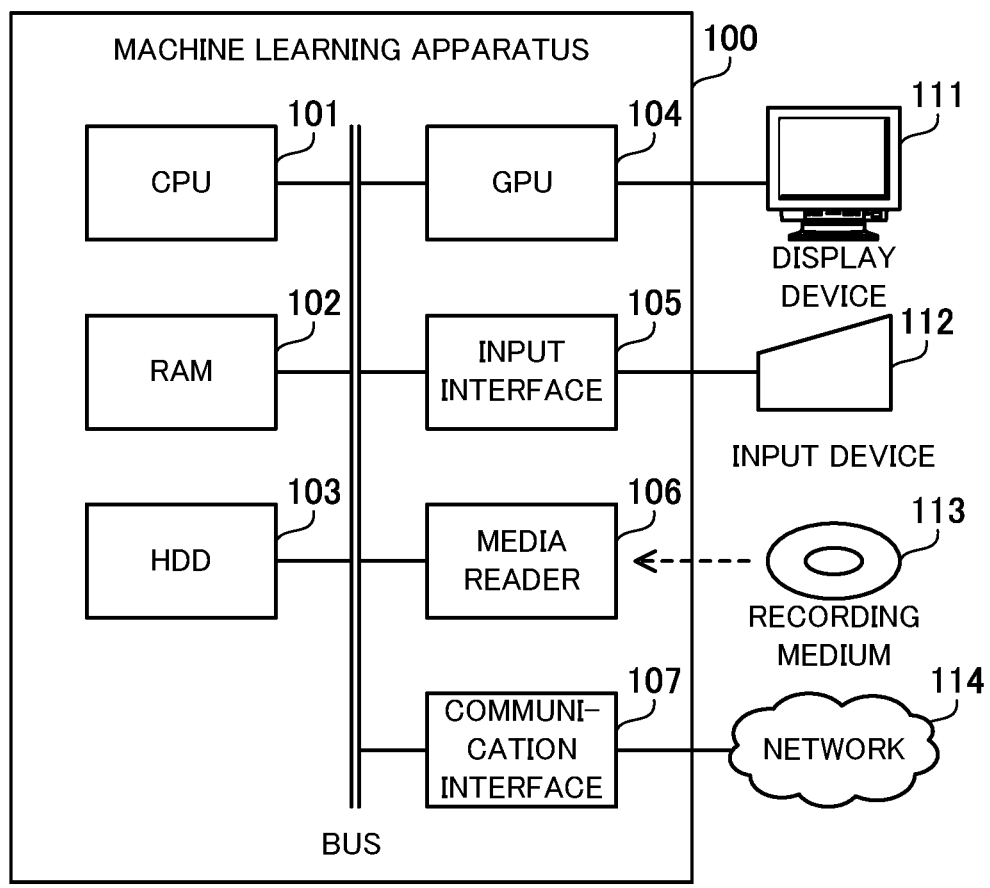
FIG. 3 illustrates a hardware example of a machine learning apparatus according to a third embodiment.

FIG. 3 illustrates a hardware example of the machine learning apparatus according to the third embodiment. The machine learning apparatus 100 includes a CPU 101, a RAM 102, an HDD 103, a GPU 104, an input interface 105, a media reader 106, and a communication interface 107. These units of the machine learning apparatus 100 are connected to a bus. The machine learning apparatus 100 corresponds to the machine learning apparatus 10 according to the first embodiment or to the named entity recognition apparatus 20 according to the second embodiment. The CPU 101 corresponds to the control unit 12 according to the first embodiment or to the control unit 22 according to the second embodiment. The RAM 102 or the HDD 103 corresponds to the storage unit 11 according to the first embodiment or the storage unit 21 according to the second embodiment.

The CPU 101 is a processor that executes program commands. The CPU 101 executes a program by loading at least part of the programs and data stored in the HDD 103 to the RAM 102. The CPU 101 may include a plurality of processor cores. The machine learning apparatus 100 may include a plurality of processors. A group of processors may be referred as a "multi-processor" or simply "a processor".

The RAM 102 is a volatile semiconductor memory that temporarily stores a program executed by the CPU 101 and data used by the CPU 101 for calculation. The machine learning apparatus 100 may include a different kind of memory other than a RAM or may include a plurality of memories.

The HDD 103 is a non-volatile storage that stores an operating system (OS), middleware, software programs such as application software, and data. The machine learning apparatus 100 may include a different kind of storage, such as a flash memory or a solid state drive (SSD), or may include a plurality of storages.

The GPU 104 outputs an image to a display device 111 connected to the machine learning apparatus 100 in accordance with a command from the CPU 101. For example, any kind of display device may be used as the display device 111. Examples of the display device 111 include a cathode ray tube (CRT) display, a liquid crystal display (LCD), an organic electro-luminescence (EL) display, and a projector. Other than the display device 111, an output device such as a printer may be connected to the machine learning apparatus 100.

The input interface 105 receives an input signal from an input device 112 connected to the machine learning apparatus 100. Any kind of input device may be used as this input device 112. Examples of the input device include a mouse, a touch panel, a touchpad, and a keyboard. A plurality of kinds of input devices may be connected to the machine learning apparatus 100.

The media reader 106 is a reading device that reads out a program and data recorded in a recording medium 113. Any kind of recording medium may be used as this recording medium 113. Examples of the recording medium 113 include a magnetic disk such as a flexible disk (FD) or an HDD, an optical disc such as a compact disc (CD) or a digital versatile disc (DVD), and a semiconductor memory. For example, the media reader 106 copies the program and data read from the recording medium 113 to another recording medium such as the RAM 102 or the HDD 103. The read program is executed by, for example, the CPU 101. The recording medium 113 may be a portable recording medium and may be used for distribution of the program and data. The recording medium 113 and the HDD 103 may each be referred to as a computer-readable recording medium.

The communication interface 107 is connected to a network 114 and communicates with other information processing apparatuses via the network 114. The communication interface 107 may be a wired communication interface connected to a wired communication device such as a switch or a router. Alternatively, the communication interface 107 may be a wireless communication interface connected to a wireless communication device such as a base station or an access point.

Figure 4:
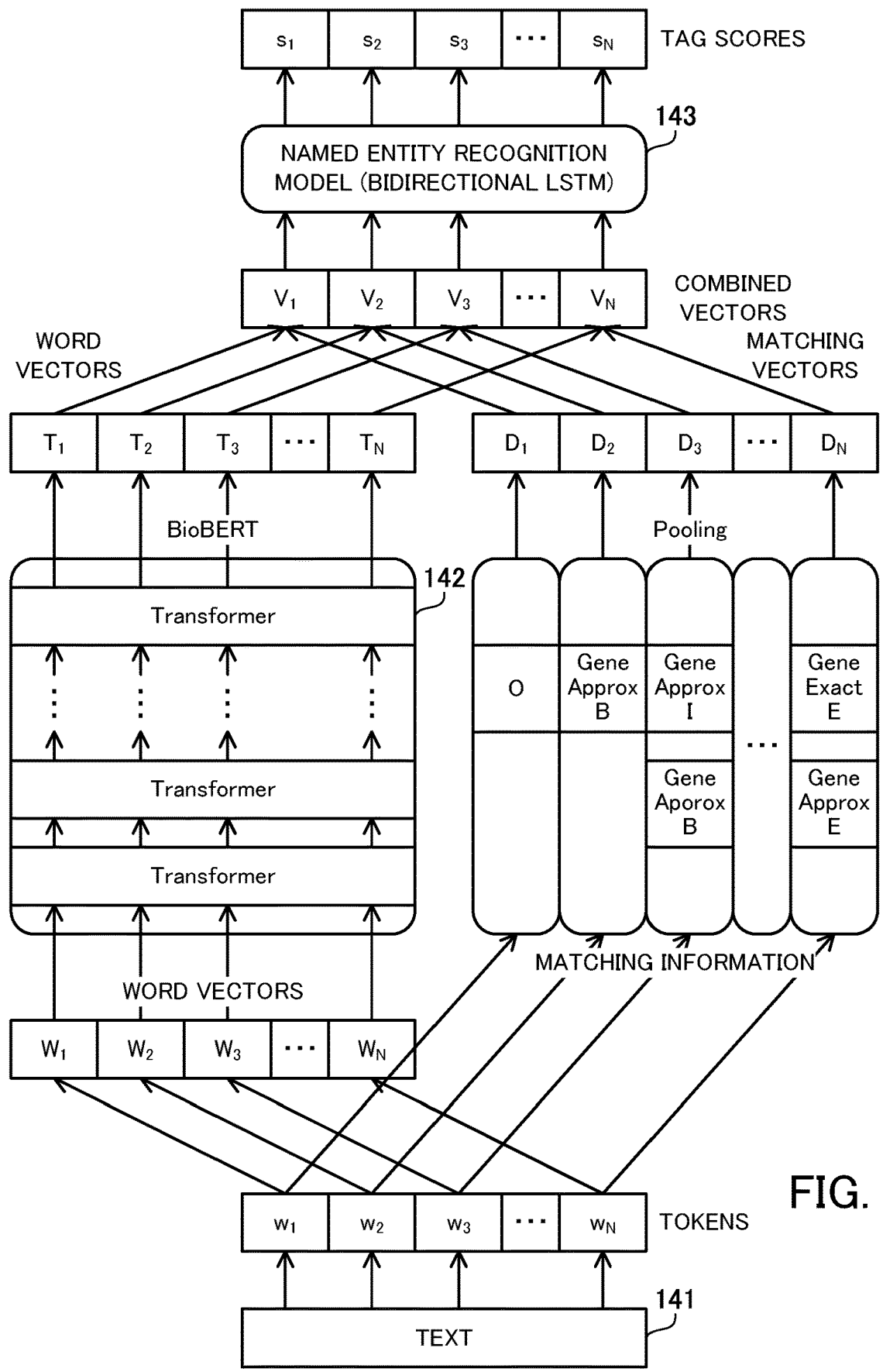
FIG. 4 illustrates a data flow example of named entity recognition.

Next, a named entity recognition model used in the third embodiment will be described. FIG. 4 illustrates a data flow example of named entity recognition. Upon receiving text 141 written in natural language, the machine learning apparatus 100 divides a character string included in the text 141 into tokens $w_1, w_2, w_3, \ldots,$ and $w_N$. The character string is divided into these tokens by using a natural language processing technique such as morphological analysis. The individual token is a character string having a certain linguistic meaning and may be a word or a linguistic unit smaller than a word. The number of tokens processed at a time is N. For example, N=256. When the text 141 is long, the following processing is performed a plurality of times.

The machine learning apparatus 100 converts the tokens $w_1, w_2, w_3, \ldots,$ and $w_N$ into word vectors $W_1, W_2, W_3, \ldots,$ and $W_N$ by converting the individual tokens into word vectors in distributed representation. The word vectors are numerical vectors in which numerical values of a predetermined number of dimensions are listed. The number of dimensions of the word vectors is, for example, 300. The word vectors $W_1, W_2, W_3, \ldots,$ and $W_N$ are calculated by using a trained multi-layer neural network such as word2vec. This multi-layer neural network is generated by the following method, for example.

A multi-layer neural network is prepared, and this network includes an input layer in which one node is assigned for each word that could appear in text, an output layer in which one node is assigned for each word that could appear in text, and an intermediate layer between the input layer and the output layer. A word and at least one peripheral word in a predetermined range before and after the word are extracted from sample text. Input data is a one-hot vector in which an element corresponding to a certain word is represented by "1" and elements corresponding to the other words are represented by "0". Training data is a vector in which at least one element corresponding to a peripheral word is represented by "1" and elements corresponding to the other words are represented by "0". The input data is given to the input layer, and an error between the output data from the output layer and the corresponding training data is calculated. The weights of edges are updated by using the backpropagation method so as to minimize the error.

In this way, the multi-layer neural network for the distributed representation is generated. A feature vector that lists numerical values calculated in the intermediate layer upon entering a one-hot vector of a certain word is a word vector in distributed representation for the word. Because similar peripheral words are highly likely to appear around words having similar meanings, similar word vectors are often assigned to words having similar meanings.

The machine learning apparatus 100 enters the word vectors $W_1, W_2, W_3, \ldots,$ and $W_N$ into BioBERT (Bidirectional Encoder Representations from Transformers for Biomedical Text Mining) 142, to convert the word vectors $W_1, W_2, W_3, \ldots,$ and $W_N$ into word vectors $T_1, T_2, T_3, \ldots,$ and $T_N$. The BioBERT 142 is a trained multi-layer neural network generated by machine learning using text in the biomedical field as training data. The BioBERT 142 includes 24 transformer layers stacked in series. Each transformer is a multi-layer neural network that converts the input vectors into different vectors.

For example, the BioBERT 142 is generated by the following method. First, a predictor is connected to the final stage of the BioBERT 142. This predictor predicts tokens from the N vectors outputted by the last transformer. N consecutive tokens are extracted from the sample text, and N word vectors corresponding to the extracted N tokens are entered into the first transformer. However, when the N word vectors are entered, a predetermined ratio of the N tokens is masked. The word vectors corresponding to the masked tokens are set to zero vectors, for example. An error is calculated between the prediction results of the N tokens outputted from the predictor and the original N tokens before the masking, and the weights of edges are updated so as to minimize the error.

Thereafter, the predictor connected to the final stage of the BioBERT 142 is changed. This predictor determines whether the latter sentence of the two sentences is related to the former sentence based on the N vectors outputted by the last transformer. Two consecutive sentences are extracted from the sample text, and word vectors corresponding to the tokens of the extracted two sentences are entered into the first transformer. The weights of edges are updated so that the predictor predicts "related". Further, two non-consecutive sentences are extracted from the sample text, and word vectors corresponding to the tokens of the extracted two sentences are entered into the first transformer. The weights of edges are updated so that the predictor predicts "not related". In this way, the BioBERT 142 is generated.

In addition, the machine learning apparatus 100 calculates matching vectors $D_1, D_2, D_3, \ldots,$ and $D_N$ corresponding to the tokens $w_1, w_2, w_3, \ldots,$ and $w_N$, separately from the word vectors $T_1, T_2, T_3, \ldots,$ and $T_N$. The matching vector of an individual token is obtained by converting matching information, which indicates a matching state between a named entity dictionary in which known named entities are listed and the token, into a vector in distributed representation. The matching vectors are calculated as follows.

The machine learning apparatus 100 comprehensively generates, from the tokens $w_1, w_2, w_3, \ldots,$ and $w_N$, n-grams each indicating n consecutive tokens (n=1, 2, 3, ..., or N). From the tokens $w_1, w_2, w_3, \ldots,$ and $w_N$, N 1-grams are generated, N−1 2-grams are generated, and N−2 3-grams are generated.

The machine learning apparatus 100 performs approximate string matching between each n-gram and a named entity dictionary prepared in advance. The named entity dictionary lists the known named entities such as gene names, drug names, and disease names in the biomedical field and the classes to which the named entities belong. In the approximate string matching, the machine learning apparatus 100 calculates the edit distance (Levenshtein distance) between one named entity listed in the named entity dictionary and one n-gram. The edit distance is the number of times of addition, replacement, or deletion of one character performed to match two character strings. "Edit distance=0" means that two character strings exactly match.

When the edit distance between a named entity and an n-gram is equal to or less than a predetermined threshold, the machine learning apparatus 100 determines that the named entity and the n-gram are similar to each other. If a named entity similar to an n-gram is found, the machine learning apparatus 100 generates matching information for each of the tokens included in the n-gram. The matching information includes three elements, which are a class, a matching degree, and a location.

The "class" is a named entity class to which a known named entity belongs. These classes are listed in the named entity dictionary. In the third embodiment, there are four named entity classes, which are gene/protein names (Gene/Protein), drug names (Drug), disease names (Disease), and mutations (Mutation). There is another class (O: Outside) indicating that the token is not a named entity. The "matching degree" is a flag indicating whether an n-gram and a known named entity have an exact match relationship (Exact) or an approximate match relationship (Approximate). The "location" is a relative location of a target token in an n-gram. There are four types of token locations, which are single (S) in the case of a 1-gram and beginning (B), inside (I), and ending (E) in the case of a 2-gram or more.

There may be two or more similar known named entities for the same n-gram. In this case, matching information is generated from each of the known named entities for the individual token included in the n-gram. In addition, when a certain token belongs to different n-grams, matching information may be generated for the token in each n-gram. Therefore, among the tokens $w_1, w_2, w_3, \ldots,$ and $w_N$, there are a token for which only one piece of matching information is obtained, a token for which two or more pieces of matching information are obtained, and a token for which no matching information is obtained. For the token for which no matching information is obtained, dummy matching information having "outside" as the class is given.

The machine learning apparatus 100 converts each piece of matching information into a matching vector. Because there are only a few patterns (matching patterns) as different matching information, a matching pattern dictionary in which matching patterns and corresponding distributed representations are associated with each other is prepared in advance. For example, the machine learning apparatus 100 assigns an identification number to each matching pattern and generates a multi-layer neural network using these identification numbers for its input and output by performing machine learning. The machine learning apparatus 100 adopts a feature vector in which numerical values calculated in the intermediate layer when an identification number of a certain matching patter is given to the input layer are listed as a matching vector in distributed representation corresponding to the matching pattern. The number of dimensions of the matching vector is, for example, 100. The matching vector corresponding to the individual matching information may have a distribution in which the numerical values of a small number of dimensions are large and the numerical values of many dimensions are small.

When different patterns of matching information are generated for one token, the machine learning apparatus 100 aggregates two or more matching vectors corresponding to the different matching information into one matching vector by performing pooling processing. In the pooling processing, a single vector having the same number of dimensions is generated by performing a numerical operation between two or more vectors per dimension. Examples of the pooling processing include a maximum (max) pooling and an average pooling. The max pooling is pooling processing in which a maximum numerical value is selected from among two or more vectors per dimension. The average pooling is pooling processing in which an average value of numerical values included in two or more vectors is calculated per dimension.

In the third embodiment, the max pooling is adopted. When the approximate string matching is comprehensively performed between the individual n-gram of the text 141 and the named entity dictionary, miscellaneous matching information is generated, and as a result, noise is generated. In this regard, by performing the pooling processing per token, it is possible to reduce the noise while maintaining information about the dimensions that are highly likely to be related to named entity recognition. That is, useful information is compressed into a single vector of a predetermined number of dimensions.

In this way, matching vectors $D_1, D_2, D_3, \ldots,$ and $D_N$ corresponding to the tokens $w_1, w_2, w_3, \ldots,$ and $w_N$ are calculated. The machine learning apparatus 100 combines the word vectors $T_1, T_2, T_3, \ldots,$ and $T_N$ and the matching vectors $D_1, D_2, D_3, \ldots,$ and $D_N$ to generate combined vectors $V_1, V_2, V_3, \ldots,$ and $V_N$. Per token, the matching vector is concatenated after the word vector. Thus, the number of dimensions of a combined vector is a sum of the number of dimensions of a word vector and the number of dimensions of a matching vector. For example, when a word vector has 300 dimensions and a matching vector has 100 dimensions, the combined vector has 400 dimensions.

For example, by concatenating the matching vector $D_1$ after the word vector $T_1$, a combined vector $V_1$ corresponding to the token $w_1$ is generated. By concatenating the matching vector $D_2$ after the word vector $T_2$, a combined vector $V_2$ corresponding to the token $w_2$ is generated. By concatenating the matching vector $D_3$ after the word vector $T_3$, a combined vector $V_3$ corresponding to the token $w_3$ is generated. By concatenating the matching vector $D_N$ after the word vector $T_N$, a combined vector $V_N$ corresponding to the token $w_N$ is generated.

The machine learning apparatus 100 enters the combined vectors $V_1$, $V_2$, $V_3$, . . . , and $V_N$ into a named entity recognition model 143 and calculates tag scores $s_1$, $s_2$, $s_3$, . . . , and $s_N$ corresponding to the tokens $w_1$, $w_2$, $w_3$, . . . , and $w_N$. The tag scores include confidence factors of the respective pieces of tag information. The individual tag information indicates a class and a location such as "Gene/Protein-B" or "Drug-E". The machine learning apparatus 100 determines tag information to be associated with each of the tokens $w_1$, $w_2$, $w_3$, . . . , and $w_N$ based on the tag scores $s_1$, $s_2$, $s_3$, . . . , and $s_N$. The machine learning apparatus 100 may select, per token, tag information having the highest confidence factor among the plurality of pieces of tag information.

In addition, the machine learning apparatus 100 may determine tag information for each of the tokens $w_1$, $w_2$, $w_3$, . . . , and $w_N$ from the tag scores $s_1$, $s_2$, $s_3$, . . . , and $s_N$ through conditional random fields (CRFs). Adjacent tokens have a dependency relationship about whether the adjacent tokens are a part of a named entity. Thus, the conditional random fields do not simply select one piece of tag information from one tag score but selects tag information in view of a dependency relationship between pieces of tag information. Upon receiving the tag scores $s_1$, $s_2$, $s_3$, . . . , and $s_N$, the conditional random fields obtain a combination of pieces of tag information that achieves the highest probability and determines the tag information per token. The conditional random fields may be represented by a trained neural network.

The named entity recognition model 143 is a multi-layer neural network. In the third embodiment, a bidirectional LSTM is used as the named entity recognition model 143. The LSTM is a multi-layer neural network that holds an internal state. Because the internal state is held, when a plurality of input vectors are continuously entered into the LSTM, an output vector corresponding to a certain input vector is not only dependent on this input vector but also dependent on a previous input vector.

The bidirectional LSTM includes a forward LSTM in which a plurality of combined vectors are entered in the forward direction (in the order of $V_1$, $V_2$, . . . , and $V_N$) and a backward LSTM in which a plurality of combined vectors are entered in the backward direction (in the order of $V_N$, $V_{N-1}$, . . . , and $V_1$). With the bidirectional LSTM, it is possible to express that a certain token is also related to a subsequent token. The bidirectional LSTM synthesizes an output vector of the forward LSTM and an output vector of the backward LSTM that correspond to the same token and calculates a final output vector for the token.

The machine learning apparatus 100 generates the named entity recognition model 143 by performing machine learning using text as training data. The procedure for generating the combined vectors $V_1$, $V_2$, $V_3$, . . . , and $V_N$, which are data inputted to the named entity recognition model 143, from the text as the training data is the same as the procedure for performing named entity recognition using the named entity recognition model 143.

The machine learning apparatus 100 enters the combined vectors $V_1$, $V_2$, $V_3$, . . . , and $V_N$ into the named entity recognition model 143 and calculates an error by comparing the tag information assigned to the text as correct labels with the tag scores $s_1$, $s_2$, $s_3$, . . . , and $s_N$. The machine learning apparatus 100 updates the weights of edges, which are parameters, by using the backpropagation method so as to minimize the error. In this updating, per token, the machine learning apparatus 100 adjusts the parameters so that the confidence factor of the correct tag information indicated by the correct label becomes the highest among the confidence factors of the plurality of pieces of tag information indicated by the tag scores.

Next, a specific example of calculating a matching vector for each token will be described. FIG. 5 illustrates an example of a named entity dictionary. The machine learning apparatus 100 holds the named entity dictionary 131 in advance. The named entity dictionary 131 includes a plurality of records, and a term identification (ID), a named entity, and a class are associated with each other in each record. The "term ID" is an identifier for identifying a named entity. A named entity registered in the named entity dictionary 131 is a known gene/protein name (Gene/Protein), drug name (Drug), disease name (Disease), or mutation (Mutation). One named entity may be one token or may include two or more tokens. The "class" indicates one of the above four classes.

For example, a named entity #101 is "epidermal growth factor", which is a gene/protein name. A named entity #102 is "epidermal growth factor-like 2", which is a gene/protein name. A named entity #103 is "epidermal growth factor receptor", which is a gene/protein name. A named entity #104 is "pro-epidermal growth factor", which is a gene/protein name.

FIG. 6 illustrates an example of a matching pattern dictionary. The machine learning apparatus 100 holds the matching pattern dictionary 132 in advance. The matching pattern dictionary 132 includes a plurality of records, and a pattern ID, a matching pattern, and a distributed representation are associated with each other in each record. The "pattern ID" is an identifier for identifying a matching pattern. The "matching pattern" indicates a matching information pattern and is obtained by concatenating three elements, which are a class, a matching degree, and a location. The class is a gene/protein name (Gene/Protein), a drug name (Drug), a disease name (Disease), a mutation (Mutation), or the others (Other). The matching degree is exact match (Exact) or approximate match (Approximate). The location is beginning (B), inside (I), ending (E), or single (S).

The "distributed representation" is a matching vector obtained by vectorizing the matching pattern. In the following specific example, for ease of description, the matching vector is expressed in five dimensions. For example, matching pattern 1 is "Gene/Protein-Exact-B", and the distributed representation thereof is (3, 2, −3, 2, 6). Matching pattern 5 is "Gene/Protein-Approximate-B", and the distributed representation thereof is (1, 6, −1, 0, 7). Matching pattern 6 is "Gene/Protein-Approximate-I", and the distributed representation thereof is (0, 4, 6, 3, 7).

The matching pattern dictionary 132 also includes a dummy matching pattern having (Other) as the class. A pattern ID and a matching vector in distributed representation are also assigned to the dummy matching pattern.

Figure 7:
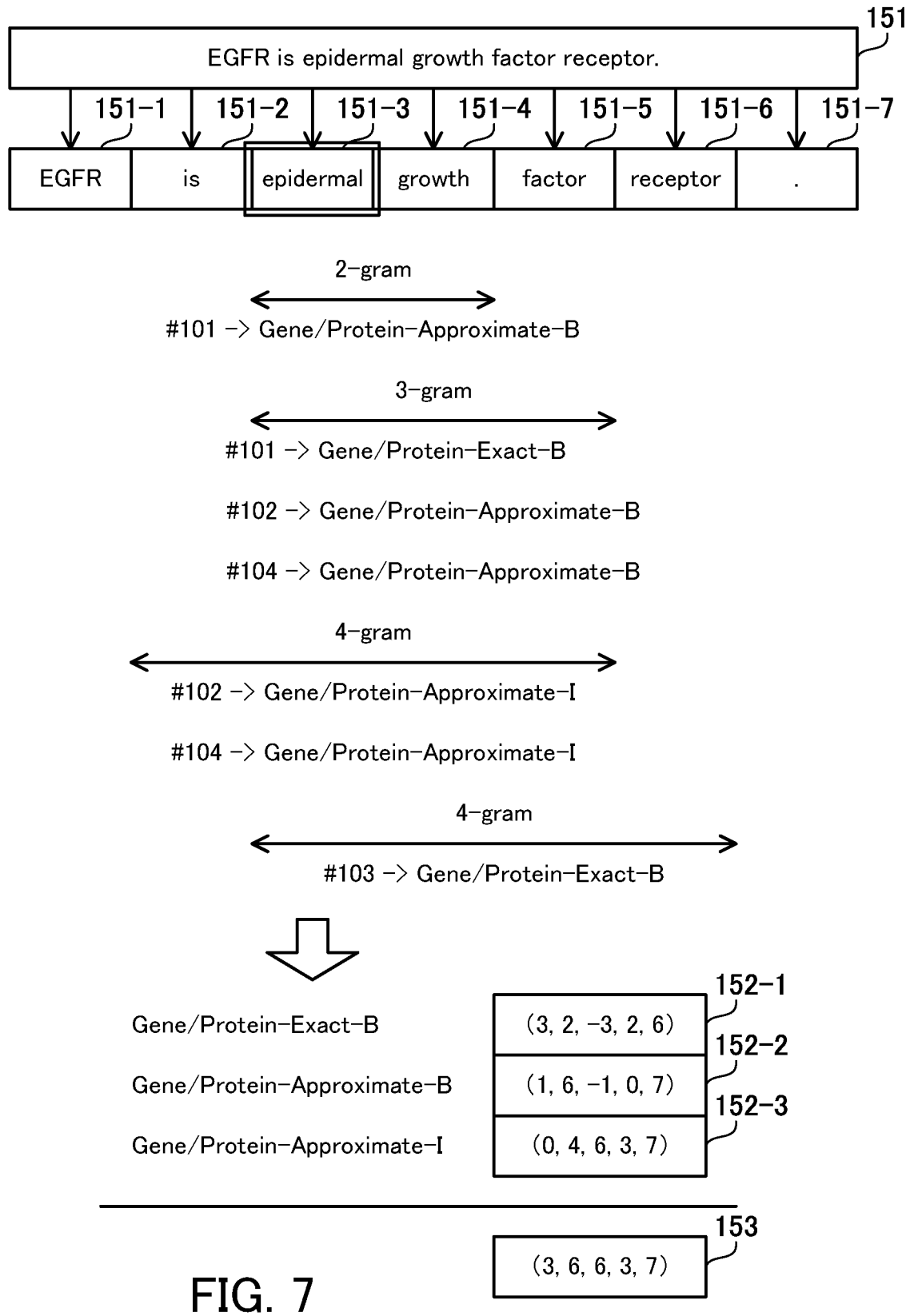
FIG. 7 illustrates a generation example of a matching vector.

FIG. 7 illustrates a generation example of a matching vector. Text 151 includes a sentence "EGFR is epidermal growth factor receptor." The machine learning apparatus 100 divides the text 151 into tokens 151-1 to 151-7 ("EGFR", "is", "epidermal", "growth", "factor", "receptor", "."). The machine learning apparatus 100 generates n-grams with the tokens 151-1 to 151-7 and performs matching processing between each n-gram and the named entity dictionary 131. In this example, some n-grams will be described, focusing on the token 151-3 ("epidermal").

The machine learning apparatus 100 performs approximate string matching between the 2-gram of the tokens 151-3 and 151-4 and the named entity dictionary 131. As a result of the matching, a named entity #101 that is similar to this 2-gram is hit. The class of the named entity #101 is Gene/Protein. The token 151-3 is the beginning token. Accordingly, the machine learning apparatus 100 generates matching information "Gene/Protein-Approximate-B" for the token 151-3.

In addition, the machine learning apparatus 100 performs approximate string matching between the 3-gram of the tokens 151-3, 151-4, and 151-5 and the named entity dictionary 131. As a result of the matching, a named entity #101 that completely matches this 3-gram is hit. Thus, the machine learning apparatus 100 generates matching information "Gene/Protein-Exact-B" for the token 151-3. In addition to the named entity #101, named entities #102 and #104 that are similar to the 3-gram are hit. Thus, the machine learning apparatus 100 generates matching information "Gene/Protein-Approximate-B" from each of the named entities #102 and #104 for the token 151-3.

Further, the machine learning apparatus 100 performs approximate string matching between the 4-gram of the tokens 151-2, 151-3, 151-4, and 151-5 and the named entity dictionary 131. As a result of the matching, the named entities #102 and #104 that are similar to this 4-gram are hit. The token 151-3 is an inside token. Accordingly, the machine learning apparatus 100 generates matching information "Gene/Protein-Approximate-I" from each of the named entities #102 and #104 for the token 151-3. In addition, the machine learning apparatus 100 performs approximate string matching between the 4-gram of the tokens 151-3, 151-4, 151-5, and 151-6 and the named entity dictionary 131. As a result of the matching, the named entity #103 that completely matches the 4-gram is hit. Thus, the machine learning apparatus 100 generates matching information "Gene/Protein-Exact-B" for the token 151-3.

As described above, three different types of matching information, which are "Gene/Protein-Exact-B", "Gene/Protein-Approximate-B", and "Gene/Protein-Approximate-I", have been obtained. The machine learning apparatus 100 converts these three types of matching information into three matching vectors by referring to the matching pattern dictionary 132. "Gene/Protein-Exact-B" corresponds to matching pattern 1 and is converted into a matching vector 152-1. "Gene/Protein-Approximate-B" corresponds to matching pattern 5 and is converted into a matching vector 152-2. "Gene/Protein-Approximate-I" corresponds to matching pattern 6 and is converted into a matching vector 152-3.

The machine learning apparatus 100 calculates a matching vector 153 from the matching vectors 152-1, 152-2, and 152-3 by performing maximum pooling. The matching vector 152-1 is (3, 2, −3, 2, 6). The matching vector 152-2 is (1, 6, −1, 0, 7). The matching vector 152-3 is (0, 4, 6, 3, 7). When the maximum value is selected per dimension, (3, 6, 6, 3, 7) is obtained as the matching vector 153 that corresponds to the token 151-3.

Figure 8:
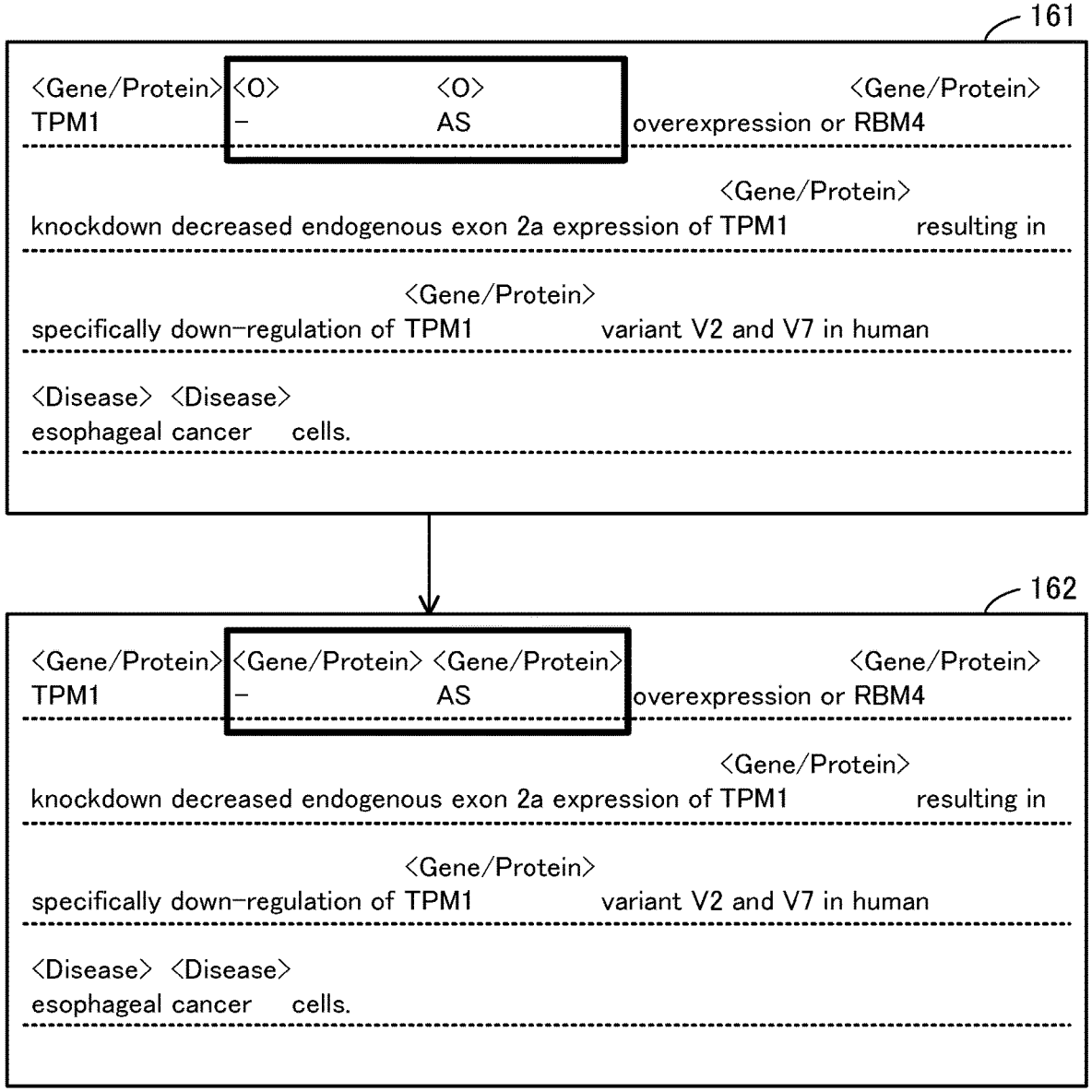
FIG. 8 illustrates examples of named entity recognition results.

FIG. 8 illustrates examples of named entity recognition results. Text 161 indicates a named entity recognition result obtained when a named entity recognition model is generated by using only the word vectors $T_1, T_2, T_3, \ldots,$ and $T_N$ as input data without using the matching vectors $D_1, D_2, D_3, \ldots,$ and $D_N$. In contrast, text 162 indicates a named entity recognition result obtained by the named entity recognition model 143 illustrated in FIG. 4.

"TPM1-AS" included in the text 161 and 162 is an unknown named entity not listed in the named entity dictionary 131 and corresponds to a gene/protein name. In the named entity recognition result indicated by the text 161, a token "TPM1" is determined to be a named entity of a single gene/protein name, and tokens "-" and "AS" are each determined to be a non-named entity. In contrast, in the named entity recognition result indicated by the text 162, "TPM1-AS" is correctly recognized as a named entity of a string of gene/protein name. Thus, it is more likely that the named entity recognition model 143 recognizes each of the gene/protein names and drug names, which are often complex compound words, as a string of proper nouns.

Figure 9:
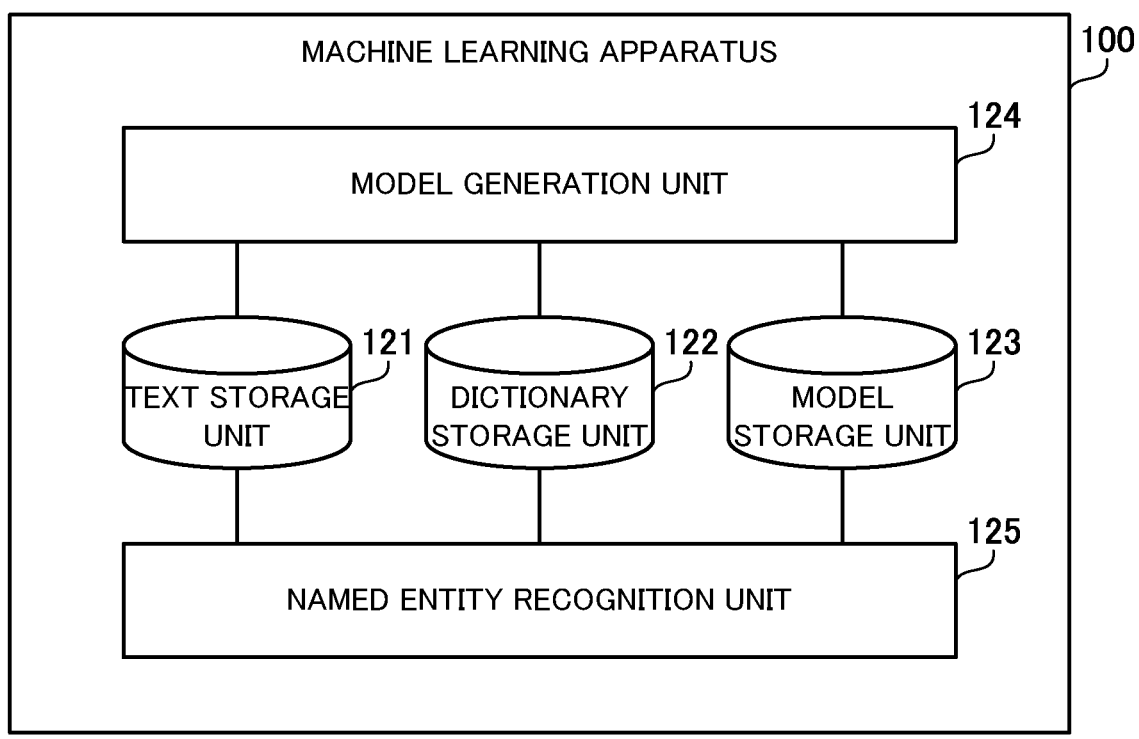
FIG. 9 is a block diagram illustrating a functional example of the machine learning apparatus.

Next, functions of the machine learning apparatus 100 will be described. FIG. 9 is a block diagram illustrating a functional example of the machine learning apparatus. The machine learning apparatus 100 includes a text storage unit 121, a dictionary storage unit 122, a model storage unit 123, a model generation unit 124, and a named entity recognition unit 125. The text storage unit 121, the dictionary storage unit 122, and the model storage unit 123 are each realized by using, for example, a storage area of the RAM 102 or the HDD 103. The model generation unit 124 and the named entity recognition unit 125 are each realized by using, for example, a program executed by the CPU 101.

The text storage unit 121 stores text as training data. Tag information indicating named entity classes are added as correct labels to the text as training data. The text storage unit 121 also stores recognition target text. The dictionary storage unit 122 stores the named entity dictionary 131 and the matching pattern dictionary 132 described above. The model storage unit 123 stores the trained BioBERT 142. Further, the model storage unit 123 stores the named entity recognition model 143 generated by the model generation unit 124.

The model generation unit 124 reads out the text as training data from the text storage unit 121, reads out the named entity dictionary 131 and the matching pattern dictionary 132 from the dictionary storage unit 122, and reads out the trained BioBERT 142 from the model storage unit 123. The model generation unit 124 converts the read text into input data and generates the named entity recognition model 143 by performing machine learning using the input data and the correct labels. The model generation unit 124 stores the generated named entity recognition model 143 in the model storage unit 123.

The named entity recognition unit 125 reads out the recognition target text from the text storage unit 121, reads out the named entity dictionary 131 and the matching pattern dictionary 132 from the dictionary storage unit 122, and reads out the trained BioBERT 142 from the model storage unit 123. The named entity recognition unit 125 converts the read text into input data. Further, the named entity recognition unit 125 reads out the trained named entity recognition model 143 from the model storage unit 123. Next, the named entity recognition unit 125 enters the input data into the named entity recognition model 143 and generates a named entity recognition result including an individual piece of tag information associated with each token.

The named entity recognition unit 125 outputs the named entity recognition result. For example, the named entity recognition unit 125 stores the named entity recognition result in a non-volatile storage. For example, the named entity recognition unit 125 displays the named entity recognition result on the display device 111. For example, the named entity recognition unit 125 transmits the named entity recognition result to another information processing apparatus.

Figure 10:
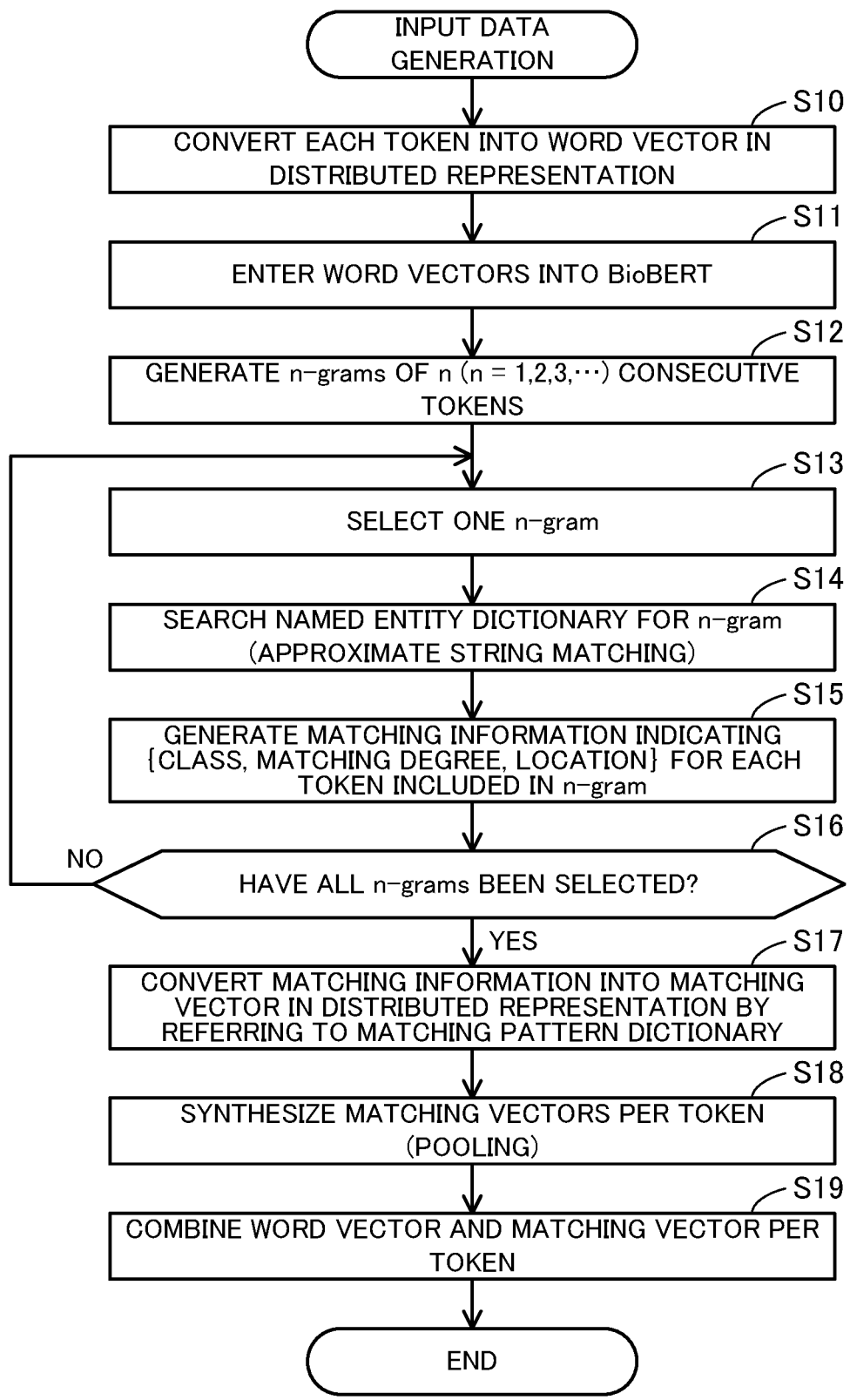
FIG. 10 is a flowchart illustrating an example of a procedure for input data generation.

Next, a processing procedure of the machine learning apparatus 100 will be described. FIG. 10 is a flowchart illustrating an example of a procedure for input data generation. The following description will be made based on a case in which the model generation unit 124 generates input data. The named entity recognition unit 125 also generates input data by performing the same procedure.

(S10) The model generation unit 124 converts each token into a word vector in distributed representation.

(S11) The model generation unit 124 enters N word vectors corresponding to N tokens into the trained BioBERT 142 and converts the N word vectors into different N word vectors.

(S12) The model generation unit 124 extracts n (n=1, 2, . . . , or N) consecutive tokens from the N tokens and comprehensively generates n-grams.

(S13) The model generation unit 124 selects one n-gram from the group of n-grams generated in step S12.

(S14) The model generation unit 124 searches the named entity dictionary 131 for the n-gram selected in step S13. In this case, approximate string matching is performed. The model generation unit 124 calculates the edit distance between the selected n-gram and each of the plurality of named entities included in the named entity dictionary 131 and searches for a similar named entity having the edit distance equal to or less than a threshold.

(S15) If at least one similar named entity is retrieved in step S14, the model generation unit 124 generates matching information indicating {class, matching degree, location} for each token included in the n-gram selected in step S13. The class is a class to which the similar named entity belongs. The matching degree is a flag indicating whether the n-gram and the similar named entity completely match or approximately match with each other. The location is a relative location of the token in the n-gram. If two or more similar named entities are retrieved in step S14, the model generation unit 124 generates the above matching information for each of the two or more similar named entities.

(S16) The model generation unit 124 determines whether all the n-grams have been selected in step S13. If all the n-grams have been selected, the processing proceeds to step S17. If there is an unselected n-gram, the processing returns to step S13.

(S17) The model generation unit 124 collects the matching information having the same content per token. For a token that does not have any matching information generated in step S15, the model generation unit 124 generates dummy matching information having (Other) as the class. The model generation unit 124 refers to the matching pattern dictionary 132 and converts different pieces of matching information into respective matching vectors in distributed representation per token.

(S18) The model generation unit 124 performs pooling processing for synthesizing the matching vectors per token. For a token having only one matching vector obtained in step S17, the model generation unit 124 adopts this one matching vector. For a token having two or more matching vectors obtained in step S17, the model generation unit 124 generates a single matching vector by performing an operation between numerical values of the same dimension. For example, the model generation unit 124 performs maximum pooling to select a maximum value per dimension.

(S19) The model generation unit 124 generates, for each of the N tokens, a combined vector by combining the word vector generated in step S11 and the matching vector generated in step S18. The combined vector is obtained by concatenating the matching vector obtained in step S18 after the word vector obtained in step S11.

Figure 11:
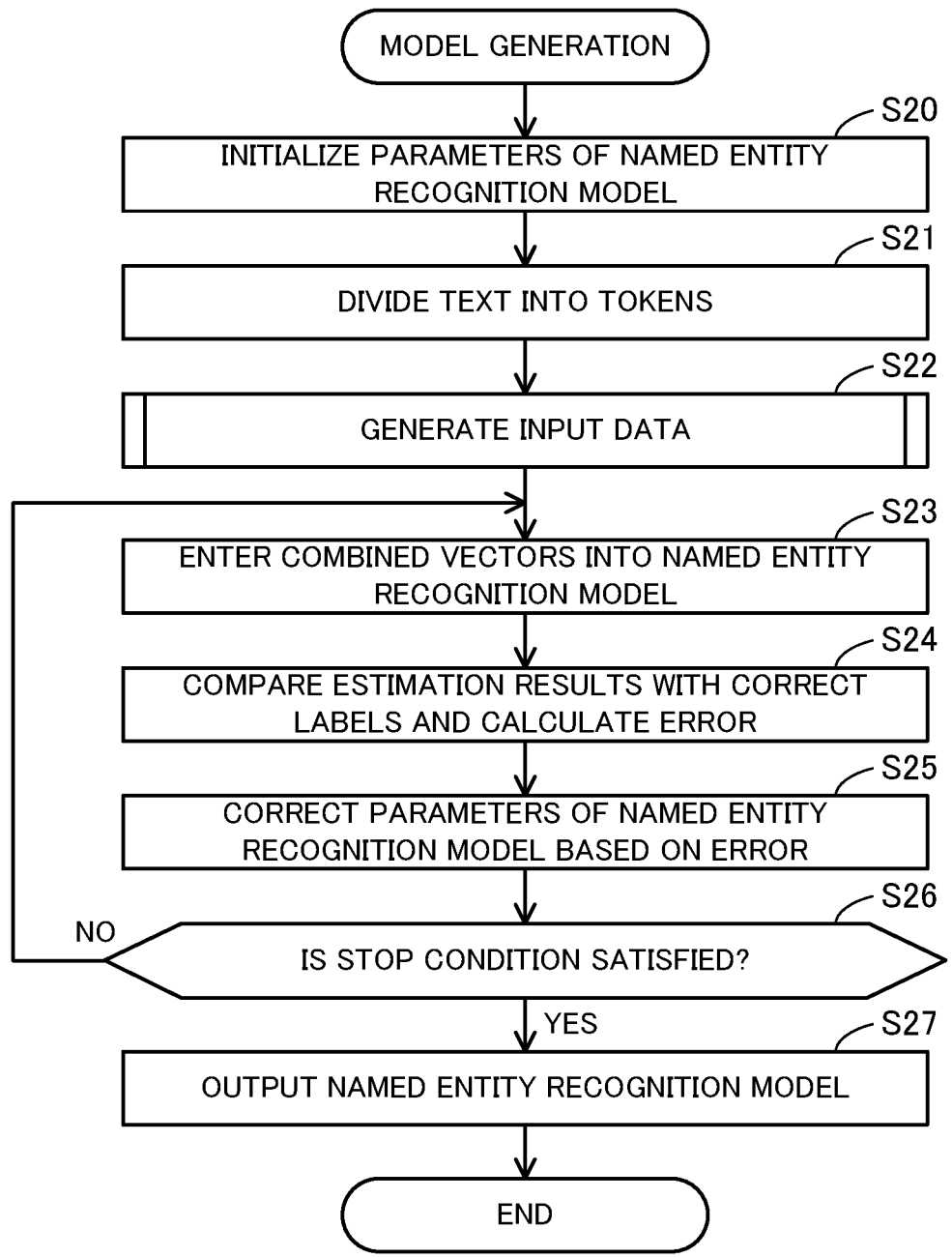
FIG. 11 is a flowchart illustrating an example of a procedure for model generation.

FIG. 11 is a flowchart illustrating an example of a procedure for model generation. (S20) The model generation unit 124 initializes parameters of the named entity recognition model 143. The individual parameter is the weight of an individual edge between nodes in the multi-layer neural network.

(S21) The model generation unit 124 divides a character string included in text for machine learning to which correct labels are assigned into a plurality of tokens.

(S22) The model generation unit 124 performs the input data generation procedure illustrated in FIG. 10. This generates a plurality of combined vectors corresponding to the plurality of tokens.

(S23) The model generation unit 124 enters the N combined vectors into the named entity recognition model 143. More specifically, the model generation unit 124 enters the N combined vectors into the forward LSTM sequentially from the beginning vector and enters the N combined vectors into the backward LSTM sequentially from the end vector. The named entity recognition model 143 consequently outputs N estimation results corresponding to the N combined vectors.

(S24) The model generation unit 124 compares the N estimation results obtained in step S23 with the correct labels of the N tokens and calculates errors therebetween. For example, the model generation unit 124 calculates, as the error of an individual token, a numerical value by subtracting the confidence factor of the corresponding correct tag information from 1 and calculates the average of the errors of the N tokens as an overall error.

(S25) The model generation unit 124 corrects the values of the parameters of the named entity recognition model 143 based on the error calculated in step S24. For example, the model generation unit 124 calculates an error gradient with respect to the parameters and changes the values of the parameters by an amount obtained by multiplying the error gradient by a predetermined learning rate. The model generation unit 124 sequentially changes the values of the parameters while propagating the error gradient from the end to the beginning of the multi-layer neural network.

(S26) The model generation unit 124 determines whether a predetermined stop condition is satisfied. If steps S23 to S25 have been repeated a predetermined number of times, the model generation unit 124 may determine that the predetermined stop condition is satisfied. Further, if the error has dropped to a value equal to or less than a threshold, the model generation unit 124 may determine that the predetermined stop condition is satisfied. When the stop condition is satisfied, the processing proceeds to step S27. When the stop condition is not satisfied, the processing returns to step S23, and steps S23 to S25 are performed by using the same or different N tokens.

(S27) The model generation unit 124 stores the named entity recognition model 143 including the trained parameter values in the model storage unit 123.

Figure 12:
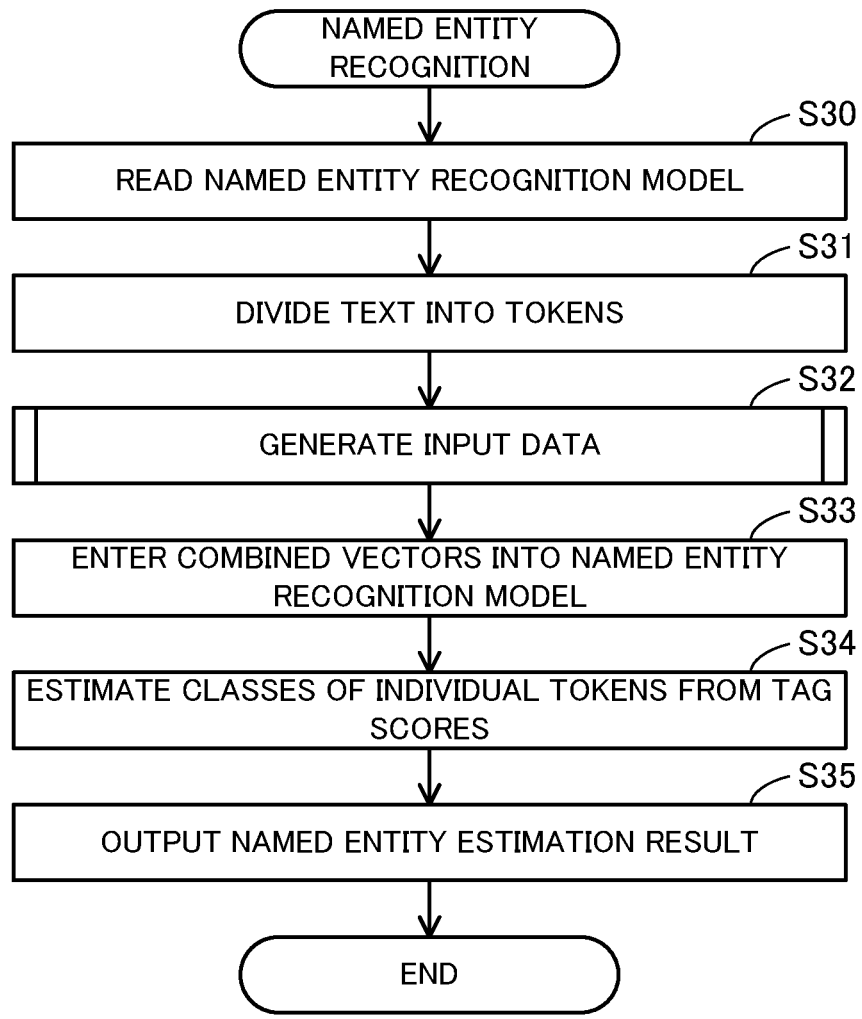
FIG. 12 is a flowchart illustrating an example of a procedure for named entity recognition.

FIG. 12 is a flowchart illustrating an example of a procedure for named entity recognition. (S30) The named entity recognition unit 125 reads out the trained named entity recognition model 143 from the model storage unit 123.

(S31) The named entity recognition unit 125 divides a character string included in recognition target text to which no correct labels are assigned into a plurality of tokens.

(S32) The named entity recognition unit 125 performs the input data generation procedure illustrated in FIG. 10. This generates a plurality of combined vectors corresponding to the plurality of tokens.

(S33) The named entity recognition unit 125 enters the N combined vectors into the named entity recognition model 143. More specifically, the named entity recognition unit 125 enters the N combined vectors into the forward LSTM sequentially from the beginning vector and enters the N combined vectors into the backward LSTM sequentially from the end vector. The named entity recognition model 143 consequently calculates N tag scores corresponding to the N combined vectors.

(S34) The named entity recognition unit 125 generates tag information including a class estimation result for each token based on the tag scores calculated in step S33. For example, the named entity recognition unit 125 selects, for each token, tag information from which the highest confidence factor is calculated. In addition, for example, the named entity recognition unit 125 enters the N tag scores into the conditional random fields to generate a string of N pieces of tag information that maximizes the probability.

(S35) The named entity recognition unit 125 outputs the named entity estimation result obtained in step S34. For example, the named entity recognition unit 125 displays the estimation result on the display device 111.

The machine learning apparatus 100 according to the third embodiment calculates the confidence factors of the named entity classes from the vectors in distributed representation by using the named entity recognition model 143, which is a multi-layer neural network. As a result, unknown named entities that are not listed in the named entity dictionary 131 are also recognized. In addition, matching information indicating the matching state between the named entity dictionary 131 and an n-gram is generated, vectorized, and combined with the corresponding word vectors, which is consequently inputted to the named entity recognition model 143. As a result, named entity recognition is performed in view of the known named entities listed in the named entity dictionary 131.

In addition, in the matching processing, not only exact string matching but also approximate string matching is performed. As a result, a new named entity created by modifying a known named entity is also recognized more accurately. In particular, gene/protein names and drug names in the biomedical field are often compound words, and new similar named entities with modified endings are often created. By using the result of the approximate string matching as input, such named entities of compound words are recognized more accurately. As a result, the machine learning apparatus 100 correctly recognizes a string of a named entity made by a plurality of tokens, without splitting the named entity in the middle.

Further, when approximate string matching is comprehensively performed between the named entity dictionary 131 and an n-gram, miscellaneous matching information is generated. If a large number of matching vectors corresponding to the miscellaneous matching information are directly inputted to the named entity recognition model 143, large noise could be generated. However, the matching vectors are combined into a single vector per token by performing the pooling processing. For example, maximum pooling is performed as the pooling processing. Thus, information about the dimensions that are highly likely to contribute to improving the accuracy of the named entity recognition remains, and the noise is removed. As a result, the accuracy of the named entity recognition is improved.

In one aspect, the accuracy of the named entity recognition for unknown words not listed in a dictionary is improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, replacements, and alterations could be made hereto without departing from the spirit and scope of the invention.

What is claimed is:

1. A non-transitory computer-readable recording medium storing therein a computer program that causes a computer to execute a process comprising:

dividing a character string included in text data into a plurality of tokens;

searching, by performing matching processing between a token string indicating a specific number of consecutive tokens among the plurality of tokens and dictionary information including a plurality of named entities and class information indicating a class for each of the plurality of named entities, the plurality of named entities for a similar named entity whose similarity to the token string is equal to or more than a threshold;

converting matching information indicating a result of the matching processing between the token string and the similar named entity into first vector data, the matching information including matching degree information indicating whether the token string and the similar named entity completely match with each other and the class information corresponding to the similar named entity, the first vector data indicating distributed representation of the matching information and including numerical values of a plurality of first dimensions;

generating input data by using a plurality of pieces of second vector data converted from the plurality of tokens and the first vector data, each of the plurality of pieces of second vector data indicating distributed representation of one of the plurality of tokens and including numerical values of a plurality of second dimensions; and generating a named entity recognition model that detects a named entity by performing machine learning using the input data, the named entity recognition model being a neural network, wherein the generated named entity recognition model performs:

outputting confidence factors representing probabilities, each confidence factor indicates a token belongs to one of a plurality of classes within the class information;

calculating an error by comparing an output of the named entity recognition model with a corresponding correct label; and updating parameters of the named entity recognition model to minimize error and train the named entity recognition model.

2. The non-transitory computer-readable recording medium according to claim 1, wherein the searching for the similar named entity includes performing the matching processing between a different token string including a shared token also included in the token string and the dictionary information, and wherein the converting of the matching information includes generating the first vector data for the shared token by using different matching information indicating a result of the matching processing performed on the different token string and the matching information.

3. The non-transitory computer-readable recording medium according to claim 2, wherein the converting of the matching information includes converting the matching information into third vector data, converting the different matching information into different third vector data, and generating the first vector data from the third vector data and the different third vector data by performing pooling processing in which an operation is performed between elements of an identical dimension.

4. The non-transitory computer-readable recording medium according to claim 1, wherein, when two or more similar named entities are retrieved from the token string, the converting of the matching information includes converting two or more pieces of matching information corresponding to the two or more similar named entities into two or more pieces of third vector data and generating the first vector data by using the two or more pieces of third vector data.

5. The non-transitory computer-readable recording medium according to claim 1,
wherein the converting of the matching information includes generating two or more pieces of matching information corresponding to two or more tokens included in the token string from a result of the matching processing and converting the two or more pieces of matching information into two or more pieces of first vector data, and
wherein the generating of the named entity recognition model includes synthesizing one of the plurality of pieces of second vector data and one of the two or more pieces of first vector data that correspond to an identical token.

6. The non-transitory computer-readable recording medium according to claim 5, wherein each of the two or more pieces of matching information includes location information indicating a relative location of a token in the token string, the token being corresponding to the each of the two or more pieces of matching information.

7. A machine learning method comprising:
dividing, by a processor, a character string included in text data into a plurality of tokens;
searching, by the processor, by performing matching processing between a token string indicating a specific number of consecutive tokens among the plurality of tokens and dictionary information including a plurality of named entities and class information indicating a class for each of the plurality of named entities, the plurality of named entities for a similar named entity whose similarity to the token string is equal to or more than a threshold;
converting, by the processor, matching information indicating a result of the matching processing between the token string and the similar named entity into first vector data, the matching information including matching degree information indicating whether the token string and the similar named entity completely match with each other and the class information corresponding to the similar named entity, the first vector data indicating distributed representation of the matching information and including numerical values of a plurality of first dimensions;

generating, by the processor, input data by using a plurality of pieces of second vector data converted from the plurality of tokens and the first vector data, each of the plurality of pieces of second vector data indicating distributed representation of one of the plurality of tokens and including numerical values of a plurality of second dimensions; and generating a named entity recognition model that detects a named entity by performing machine learning using the input data, the named entity recognition model being a neural network, wherein the generated named entity recognition model performs:

outputting confidence factors representing probabilities, each confidence factor indicates a token belongs to one of a plurality of classes within the class information;

calculating an error by comparing an output of the named entity recognition model with a corresponding correct label; and updating parameters of the named entity recognition model to minimize error and train the named entity recognition model.

8. A named entity recognition apparatus comprising:
a memory configured to store dictionary information including a plurality of named entities and class information indicating a class for each of the plurality of named entities, and a named entity recognition model; and a processor configured to execute a process including:
dividing a character string included in text data into a plurality of tokens,
searching, by performing matching processing between a token string indicating a specific number of consecutive tokens among the plurality of tokens and dictionary information, the plurality of named entities for a similar named entity whose similarity to the token string is equal to or more than a threshold,
converting matching information indicating a result of the matching processing between the token string and the similar named entity into first vector data, the matching information including matching degree information indicating whether the token string and the similar named entity completely match with each other and the class information corresponding to the similar named entity, the first vector data indicating distributed representation of the matching information and including numerical values of a plurality of first dimensions,
generating input data by using a plurality of pieces of second vector data converted from the plurality of tokens and the first vector data, each of the plurality of pieces of second vector data indicating distributed representation of one of the plurality of tokens and including numerical values of a plurality of second dimensions, and
generating a named entity recognition model that detects a named entity by performing machine learning using the input data, the named entity recognition model being a neural network,
wherein the generated named entity recognition model performs:
outputting confidence factors representing probabilities, each confidence factor indicates a token belongs to one of a plurality of classes within the class information;

calculating an error by comparing an output of the named entity recognition model with a corresponding correct label; and updating parameters of the named entity recognition model to minimize error and train the named entity recognition model.

* * * * *